W. G. PRICE.
BOX OR PACKAGE HANDLING APPARATUS.
APPLICATION FILED OCT. 11, 1919.
1,416,060.
Patented May 16, 1922.
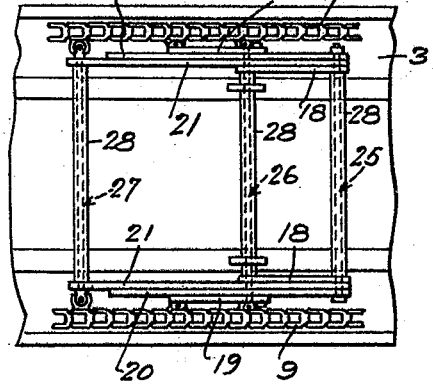
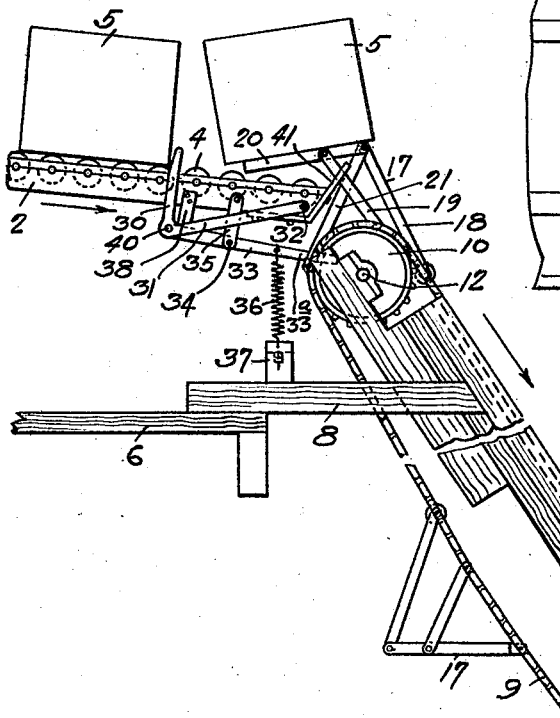
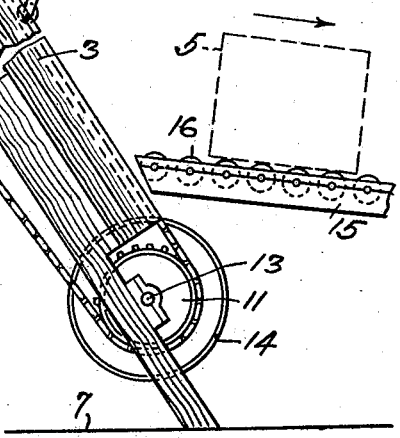
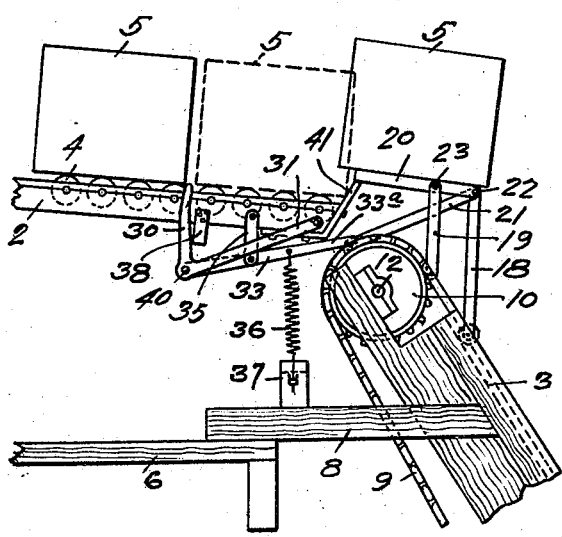
INVENTOR
William G. Price

UNITED STATES PATENT OFFICE.

WILLIAM G. PRICE, OF YAKIMA, WASHINGTON.

BOX OR PACKAGE HANDLING APPARATUS.

1,416,060.  Specification of Letters Patent.  Patented May 16, 1922.

Application filed October 11, 1919. Serial No. 329,983.

*To all whom it may concern:*

Be it known that I, WILLIAM G. PRICE, a citizen of the United States, and a resident of Yakima, in the county of Yakima and State of Washington, have invented a new and useful Improvement in Box or Package Handling Apparatus; and I do hereby declare the following to be a full, clear, and exact description thereof.

My invention relates to conveyers for handling boxes, packages or other articles, and it has special reference to the general type of apparatus of this character in which articles such as uncovered and packed boxes of fruit may be automatically delivered to an endless chain conveyer for transporting the same from one elevation to another.

In my co-pending applications for Letters Patent, Serial No. 306,239, filed June 23, 1919, and Serial No. 322,810, filed Sept. 10, 1919, I have described and claimed certain conveyer devices adapted to transport boxes from a lower elevation to a higher elevation.

The object of my present invention is to provide a device of the same general character as those of the previous applications referred to, but adapted to transport the boxes or other packages from a higher elevation to a lower elevation.

A further object of my invention is to provide an improved stop mechanism for insuring the regular and orderly delivery of the boxes or packages to the conveyer.

One embodiment of my invention is shown in the accompanying drawing, in which Fig. 1 is a vertical elevational view, with parts broken away, of my improved apparatus; Fig. 2 is a vertical elevational view of a portion of the same apparatus, showing the stop mechanism in another position; and Fig. 3 is an enlarged plan view of one of the article carriers.

Referring to the drawings, the numeral 2 indicates the delivery portion of a gravity conveyer which is inclined slightly toward the elevator frame 3, and which is provided with idler wheels 4 which support the boxes 5 as they move down the gravity conveyer. The elevator frame 3 extends from the floor 6 downward to the floor 7 at any suitable angle, and is supported at the upper floor 6 by the braces 8. The elevator comprises a traveling carrier consisting of two parallel endless chains or link belts 9 and is mounted to travel upon upper and lower pairs of sprocket wheels 10 and 11, which are mounted upon horizontal shafts 12 and 13, respectively. A pulley 14 is shown mounted upon shaft 13, and may be driven from any suitable source of power, not shown. A second gravity conveyer 15 is supported adjacent to the lower end of the elevator frame to receive the boxes 5, and is provided with idler wheels 16.

To the chains 9 are attached any convenient number of article supports or brackets which are designated generally by the numeral 17, and which severally consist of a long lever-arm or brace 18 and a short lever-arm or brace 19, both of the said braces being pivotally secured to the chain 9, and also pivotally secured at their outer ends to an article-supporting bar 20. A third lever-arm or brace 21 is pivotally secured at one end to the chain 9, and is pivoted at its outer end 22 to the article-supporting member 20. This construction of braces and article supporting-bar is duplicated at the other side of the conveyer, and the points of pivotal attachment 22, 23 and 24 are connected by means of rods 25, 26 and 27, respectively, upon which are mounted sections of pipe 28 for maintaining the lever-arms in proper spaced relation.

The stop mechanism which insures the proper delivery of boxes to the conveyer, consists of a stop member 30 carried at the outer end of an arm 31 which is pivotally secured at 32 to the frame of the gravity conveyer 2. A trip lever 33 is pivotally supported at a point 34 intermediate its ends by means of a bar 35 carried by the frame of the gravity conveyer 2. One end of the trip lever 33 is pivotally secured to the point of attachment between the stop member 30 and the arm 31 and the other or free end 33ª of the trip lever 33 extends into the path of movement of the rod 25 which forms a part of the article carriers 17. An extension spring 36 is attached to the trip lever 33 and to a fixed support 37 in such a way that the free end of the trip lever is resiliently held down, in which position the stop member 30 is interposed in the path of the boxes 5, as they descend the gravity conveyer 2. A stop member 38 is secured to the frame of the gravity conveyer 2 to engage the trip-lever 33 and thereby limit the upward movement of the stop member 30. Two or more stop members 30 may conveniently be provided in order to make contact with the box 5 at several points, in which case the several stop members, with their supporting arms 31, may be connected by means of a rod 40 to which the trip-lever 33 may be pivotally secured at any convenient point.

In the operation of my device each box or other package to be handled descends the gravity conveyer 2 until it reaches the stop member 30. When the next bracket 17 ascends nearly to the top of its path of travel, the pipe 28 surrounding the rod 25 engages the free end 33ᵃ of the trip lever 33 and moves it upward against the tension of the spring 36, thereby depressing the stop member 30 and releasing the box 5, which thereupon descends the gravity conveyer until its movement is arrested by a fixed stop member 41 secured to the ends of the gravity conveyer 2. The article support or bracket which effected the withdrawal of the movable stop member 30 has meanwhile continued its movement and released the trip-lever 33, whereupon the spring 36 causes the stop-member 30 to be again raised into position to stop the next box descending the gravity conveyer.

The succeeding bracket 17 again actuates the stop-member 30 and, in addition, picks up the first box 5, as shown in Fig. 1. This is accomplished by means of the braces 19 which, as the article carrier passes around the sprocket wheel 10, force the box-receiving bars 20 to assume a substantially horizontal position while lifting the box from the gravity conveyer. Thereafter, as the article support descends on the chains 9, the lever-arms 18 and 19 assume the position shown mid-way of the elevator on Fig. 1, the bars 20 being constantly maintained in a substantially horizontal position throughout the portion of their travel in which they support the box 5. Upon reaching the lower end of the elevator, the article support passes between the side frames of the gravity conveyer 15 and deposits the box 5 upon the gravity conveyer.

The article supporting bars 20 may be spaced apart far enough to pass the side rails of the upper and lower roller conveyers 2 and 15, or if desired these roller conveyers may be made wider than the space between the bars 20, in which case the portions of these conveyers adjacent to the path of movement of the bars 20 would of course be made up of parallel rows of rollers having spaces between the rows for the passage of the bars 20.

The device which I have shown and described is intended to be merely illustrative of my invention, and it is to be understood that my invention may be widely varied in construction and arrangement of parts. I therefore desire that no limitations be imposed upon my invention except such as are indicated in the appended claims.

What I claim is:

1. A conveyer comprising a traveling carrier traversing a non-rectilinear path at its upper end, an article-supporting member disposed to travel with said carrier and adapted to rise above the said upper end thereof, and braces pivotally connected to said carrier and adapted to maintain said member in article-supporting position while passing around and above the said upper end of said carrier.

2. A conveyer comprising a frame, a traveling carrier including an endless chain traversing a non-rectilinear path at the upper end of said frame and having a straight path below the said upper end, an article-supporting member mounted to travel with said chain, and adapted to rise above said upper end of said frame, and braces pivotally connected to said carrier and adapted to maintain said article-supporting member substantially level while passing with said chain around and above the said upper end of said frame and also while traversing the said straight path.

3. In a conveyer for transporting articles from a higher elevation to a lower elevation, the combination of a plurality of vertically spaced sprocket wheels, an inclined carrier comprising a traveling chain passing around the said sprocket wheels, an article support mounted to travel with the said chain, and comprising an article supporting member adapted to pass around and above the upper sprocket wheel, and braces pivotally connected to said chain and to said member, and adapted to maintain said member in a substantially horizontal position while said article support is passing around and above the upper one of said sprocket wheels and descending to the lower one of said wheels.

4. A conveyer comprising an inclined endless carrier, means for automatically loading an article on the said carrier above the upper end thereof, and braces pivotally connected to said carrier for maintaining the said article in a substantially horizontal position while being loaded and conveyed.

5. A conveyer comprising an inclined endless carrier, means for automatically loading an article on the said carrier above the upper end thereof, braces pivotally connected to said carrier for maintaining the said article substantially upright while being loaded and conveyed, and means for automatically unloading the said carrier below the upper end thereof.

6. A conveyer comprising an inclined endless carrier, article-supports mounted to move with said carrier and adapted to rise above the top of said carrier while passing the upper end thereof, means for automatically delivering articles to said supports while passing above the upper end of said carrier and braces pivotally connected to said carrier and adapted to maintain said supports substantially level while receiving the articles and while descending said carrier.

7. A conveyer comprising an endless carrier, an article-supporting member moving with said carrier, and three braces, each pivotally connected to said carrier and to said member, and adapted to maintain the said member in article-supporting position while traversing a non-rectilinear path.

8. A conveyer comprising a frame, sprocket wheels mounted on said frame, parallel endless chains extending around said sprocket wheels, and an article-supporting member moving with said chains, each of said chains carrying three braces pivotally connected thereto and to said member, said braces being adapted to maintain said member in article-supporting position while traversing both a straight portion and a non-rectilinear portion of said conveyer.

9. A conveyer comprising an endless chain, an article-supporting member moving with said chain, and three braces for supporting and moving said member, two of the said braces having a common pivotal connection to said member and having spaced pivotal connections to said chain, and the third brace being pivotally connected to said chain between the pivotal connections of the two first-named braces.

10. A conveyer comprising a frame, sprocket wheels mounted on said frame, parallel endless chains extending around said sprocket wheels, and article-supporting members carried by said chains, each of the said members being supported and operated by means of three braces carried by each chain, two of said three braces in each set having a common pivotal connection to said member and having spaced pivotal connections to the adjacent chain, and the third brace being pivotally connected to said chain between the pivotal connections of the two first named braces.

11. A conveyer comprising a traveling carrier including an endless chain and an article-supporting bracket carried thereby, the said bracket comprising an article support and three braces associated with said support and pivotally connected to three spaced points on said chain, the brace connected to the intermediate point on said chain being advanced, when said bracket passes around the end of said carrier, to maintain said support in article-supporting position.

In testimony whereof I, the said WILLIAM G. PRICE, have hereunto set my hand.

WILLIAM G. PRICE.

Witnesses:
EMILE B. VELIKANJE,
MILAN VELIKANJE.